(12) United States Patent
Lee

(10) Patent No.: US 11,993,276 B2
(45) Date of Patent: May 28, 2024

(54) INTEGRATED CONTROL APPARATUS AND METHOD FOR NORMAL AND EMERGENCY CONTROL OF VEHICLE

(71) Applicant: HYUNDAI MOBIS CO., LTD., Seoul (KR)

(72) Inventor: Jeong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/704,803

(22) Filed: Mar. 25, 2022

(65) Prior Publication Data

US 2022/0212684 A1 Jul. 7, 2022

Related U.S. Application Data

(63) Continuation of application No. 16/436,151, filed on Jun. 10, 2019, now Pat. No. 11,312,387.

(30) Foreign Application Priority Data

Jul. 20, 2018 (KR) .......................... 10-2018-0084566

(51) Int. Cl.
 *B60W 50/04* (2006.01)
 *B60W 10/04* (2006.01)
 (Continued)

(52) U.S. Cl.
 CPC .......... *B60W 50/045* (2013.01); *B60W 10/04* (2013.01); *B60W 10/20* (2013.01);
 (Continued)

(58) Field of Classification Search
 CPC ............................ B60W 10/04; B60W 50/045
 See application file for complete search history.

(56) References Cited

U.S. PATENT DOCUMENTS 4,687,214 A * 8/1987 Uno ....................... B62D 7/148
 180/404
8,452,465 B1 5/2013 Sinha et al.
 (Continued)

FOREIGN PATENT DOCUMENTS

CN 103488161 A 1/2014
CN 105292115 A 2/2016
 (Continued)

OTHER PUBLICATIONS

Office Action of corresponding Korean Patent Application No. 10-2018-0084566—7 pages (Sep. 4, 2019).
 (Continued)

*Primary Examiner* — Jess Whittington
(74) *Attorney, Agent, or Firm* — NSIP Law

(57) ABSTRACT

An integrated control apparatus and method for a vehicle are provided. The integrated control apparatus for the vehicle includes: a sensor unit comprising one or more sensing devices provided in the vehicle, wherein each of the one or more sensing devices provides driving environment information by sensing driving environments of the vehicle; an integrated control unit configured to generate one or more control commands for driving control of the vehicle based on one or more pieces of driving condition information of the vehicle received from a network of the vehicle and each driving environment information received from the sensor unit, mediate the generated control commands according to priorities determined based on driving safety of the vehicle and assigned to the respective control commands, and generate a final control command in which output response characteristic of the driving control according to the control command having higher priority is optimized.

11 Claims, 12 Drawing Sheets

(51) Int. Cl.
    *B60W 10/20*      (2006.01)
    *B60W 30/18*      (2012.01)
    *G05D 1/00*       (2006.01)

(52) U.S. Cl.
    CPC .......... *B60W 30/18* (2013.01); *G05D 1/0088* (2013.01); *B60W 2554/00* (2020.02); *B60W 2556/00* (2020.02); *B60W 2710/22* (2013.01); *B60W 2720/106* (2013.01)

(56) References Cited

U.S. PATENT DOCUMENTS

| | | | |
|---|---|---|---|
| 9,834,159 B2 | 12/2017 | Kajiwara | |
| 2007/0255469 A1* | 11/2007 | Uenuma | B60N 2/0244 701/1 |
| 2019/0258251 A1 | 8/2019 | Ditty et al. | |
| 2019/0265703 A1 | 8/2019 | Hicok et al. | |
| 2020/0057453 A1* | 2/2020 | Laws | B60W 30/18 |
| 2021/0053564 A1* | 2/2021 | Imamura | B60T 8/175 |

FOREIGN PATENT DOCUMENTS

| | | |
|---|---|---|
| JP | 2016-218996 A | 12/2016 |
| JP | 2018-095254 A | 6/2018 |
| KR | 10-2012-0022305 A | 3/2012 |
| KR | 10-2016-0013817 A | 2/2016 |

OTHER PUBLICATIONS

Chinese Office Action issued on Jun. 6, 2022, in counterpart Chinese Patent Application No. 201910598626.X (10 pages in Chinese).

* cited by examiner

INTEGRATED CONTROL APPARATUS AND METHOD FOR NORMAL AND EMERGENCY CONTROL OF VEHICLE

CROSS-REFERENCES TO RELATED APPLICATIONS

The present application is a continuation of Ser. No. 16/436,151 filed on Jun. 10, 2019, which claims the benefit of priority to Korean application number 10-2018-0084566, filed on Jul. 20, 2018, which is incorporated by reference in its entirety.

BACKGROUND

The present invention relates to an integrated control apparatus and method for a vehicle, and more particularly, to an integrated control apparatus and method for a vehicle, which control driving of the vehicle by performing integrated mediation on control commands generated by a plurality of systems provided in the vehicle.

An autonomous vehicle refers to a vehicle which recognizes a surrounding environment through external information detecting and processing functions during driving, autonomously determines a driving route, and drives independently by using its own power. Even if a driver does not operate a steering wheel, an accelerator pedal, or a brake, the autonomous vehicle may avoid collision with obstacles present on the driving route, and may drive to the destination for itself while adjusting the vehicle speed and direction according to a shape of a road. For example, acceleration may be performed on a straight road, and deceleration may be performed on a curved road, while changing the driving direction according to the curvature of the road.

A plurality of driver assistance systems (DASs) for assisting the driving of the driver are applied to such autonomous vehicles, and examples of the driver assistance systems include Advanced Smart Cruise Control (ASCC), Lane Departure Warning System (LDWS), Lane Keeping Assistance System (LKAS), High Beam Assistance (HBA), Autonomous Emergency Braking (AEB), and Blind Spot Detection (BSD).

Until now, the driver assistance system applied to the vehicle includes a few systems to which individual systems or single sensors are applied. In order to realize a high-level autonomous driving system in the future, a plurality of driver assistance systems using a plurality of sensor information must be integrated into one system. This requires an integrated architecture for controlling integrated driver assistance systems. In addition, since a redundancy problem may occur between the respective control commands generated by a plurality of driver assistance systems, there is a need for an integrated control system capable of integrating and mediating a plurality of control commands, and there is a need for a substitute logic capable of performing autonomous driving control of a vehicle in a state in which the integrated control system cannot be controlled due to extensive control operations.

The background art of the present invention is disclosed in Korean Patent Application Publication No. 10-2012-0022305 (published on Mar. 12, 2012).

SUMMARY

Embodiments of the present invention are directed to an integrated control apparatus and method for a vehicle, which are capable of presenting an integrated architecture in which a plurality of driver assistance systems are integrated, and integrating and mediating a plurality of control commands generated by a plurality of driver assistance systems.

In one embodiment, an integrated control apparatus for a vehicle includes: a sensor unit including one or more sensing devices provided in the vehicle, wherein each of the one or more sensing devices provides driving environment information by sensing driving environments of the vehicle; an integrated control unit configured to generate one or more control commands for driving control of the vehicle based on one or more pieces of driving condition information of the vehicle received from a network of the vehicle and each driving environment information received from the sensor unit, mediate the generated control commands according to priorities determined based on driving safety of the vehicle and assigned to the respective control commands, and generate a final control command in which output response characteristic of the driving control according to the control command having higher priority is optimized.

The integrated control unit may include: a merging unit configured to generate merged driving condition information and merged driving environment information by merging the driving condition information and the driving environment information; and a control command generation unit configured to generate one or more control commands for driving control of the vehicle based on the merged driving condition information and the merged driving environment information.

The control command generation unit may include: a longitudinal control command generation unit configured to generate an acceleration/deceleration control command for avoiding a collision with an external object located in the longitudinal direction of the vehicle, based on the merged driving condition information and the merged driving environment information; a transverse control command generation unit configured to generate a steering control command for avoiding a collision with an external object located in the transverse direction of the vehicle or preventing lane departure during driving, based on the merged driving condition information and the merged driving environment information; and a control command generation unit configured to generate a basic control command for real-time driving of the vehicle, based on the merged driving condition information and the merged driving environment information.

The integrated control unit may further include a control command integration unit configured to generate a final control command, in which output response characteristic of the driving control according to an emergency control command is optimized, by assigning higher priority to the emergency control command determined by one of the acceleration/deceleration control command transmitted from the longitudinal control command generation unit and the steering control command transmitted from the transverse control command generation unit as compared with the basic control command transmitted from the basic control command generation unit.

The control command integration unit may generate the final control command that minimizes a delay time until the start of the driving control according to the emergency control command in consideration of the signs of the emergency control command and the basic control command.

When the signs of the emergency control command and the basic control command are the same, the control command integration unit may generate the final control command by correcting the emergency control command, with the value of the basic control command at the time of generating the emergency control command as an initial value of the emergency control command.

When the signs of the emergency control command and the basic control command are different, the control command integration unit may generate the emergency control command as the final control command.

The integrated control apparatus may further include: a failure determination unit configured to determine failure or not of the integrated control unit by determining validity of at least one of the merged driving condition information, the merged driving environment information, the respective control commands, and the final control command; and a backup control unit configured to, when the failure determination unit determines that the integrated control unit is failed, generate a backup control command for driving control of the vehicle based on the driving environment information received from the sensor unit.

In another embodiment, an integrated control method for a vehicle includes: receiving, by an integrated control unit, one or more pieces of driving condition information of the vehicle and driving environment information generated by sensing driving environments of the vehicle by one or more sensing devices provided in the vehicle; generating, by the integrated control unit, one or more control commands for driving control of the vehicle based on the driving condition information and the driving environment information; and mediating, by the integrated control unit, each control command according to priority determined based on driving safety of the vehicle and assigned to each control command, and generating a final control command in which output response characteristic of the driving control according to a control command having higher priority is optimized.

DESCRIPTION OF SPECIFIC EMBODIMENTS

Hereinafter, an integrated control apparatus and method for a vehicle in accordance with embodiments of the present invention will be described with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
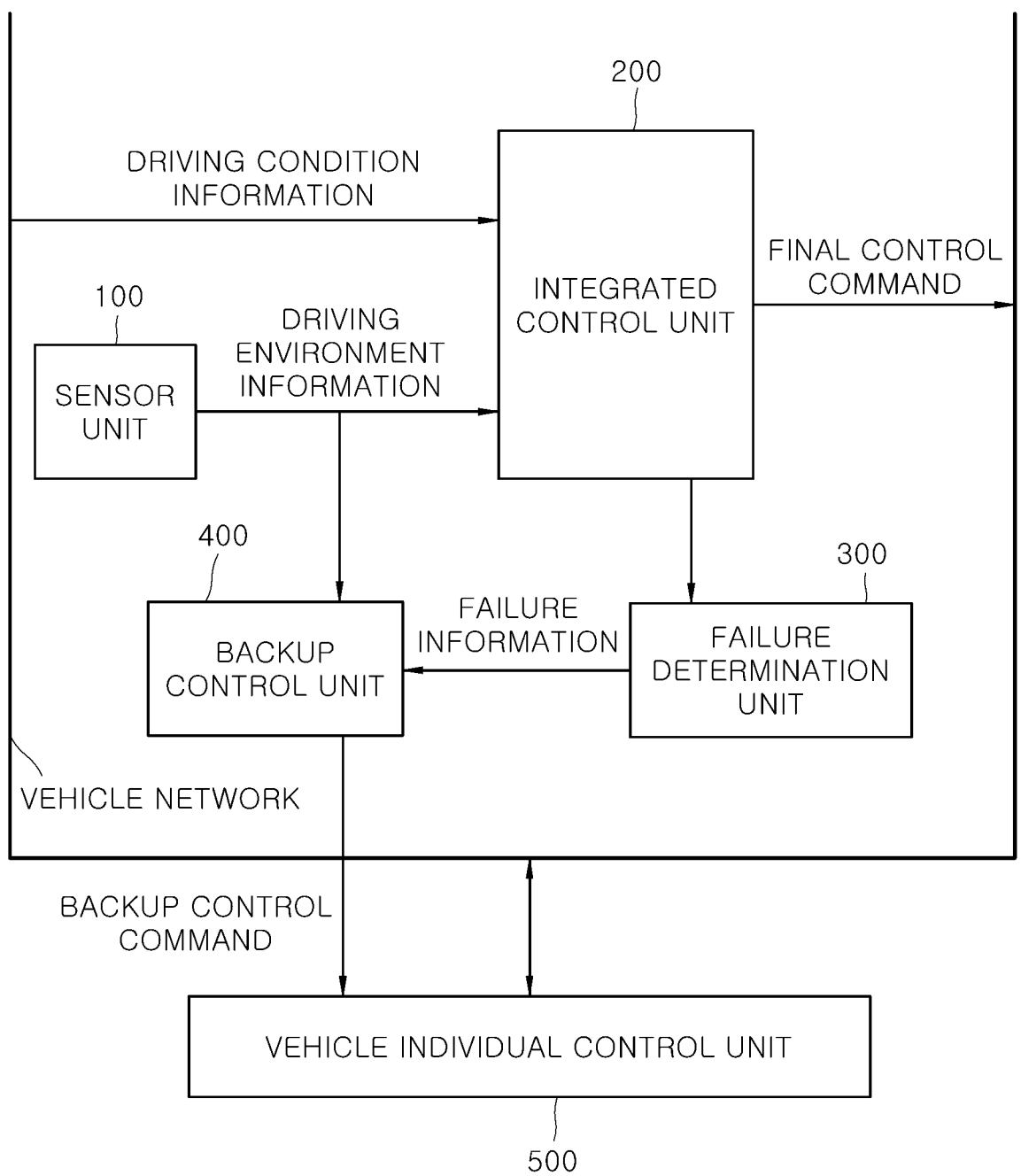
FIG. 1 is a block diagram illustrating an integrated control apparatus for a vehicle in accordance with an embodiment of the present invention.
Figure 2:
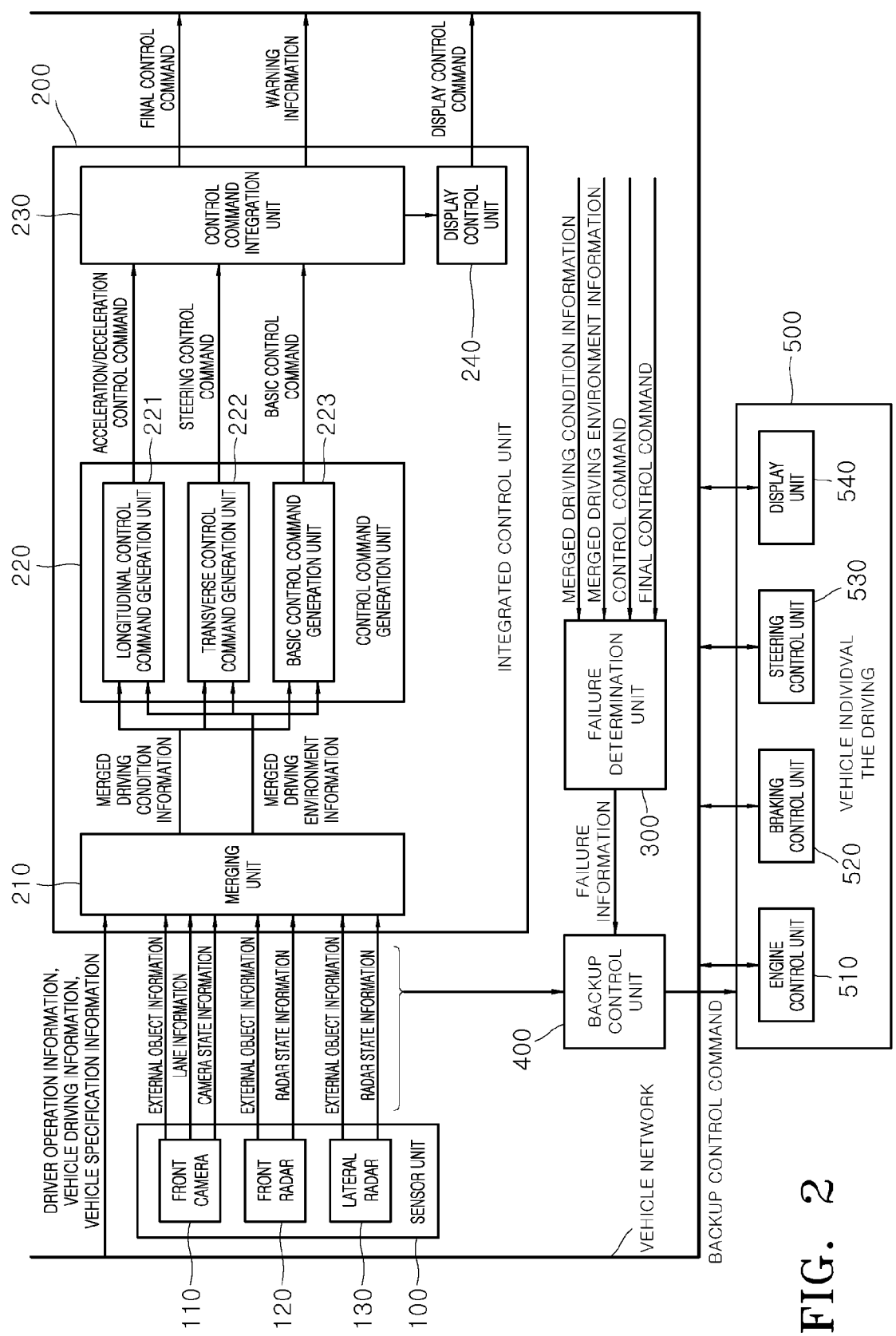
FIG. 2 is a block diagram illustrating a detailed configuration of the integrated control apparatus for the vehicle in accordance with an embodiment of the present invention.

FIG. 1 is a block diagram illustrating an integrated control apparatus for a vehicle in accordance with an embodiment of the present invention, FIG. 2 is a block diagram illustrating a detailed configuration of the integrated control apparatus for the vehicle in accordance with an embodiment of the present invention, and FIGS. 3A-3E and 4A-4C are exemplary diagrams for describing a process of generating a final control command by a control command integration unit in an integrated control apparatus for a vehicle in accordance with an embodiment of the present invention.

Referring to 1 and 2, an integrated control apparatus for a vehicle in accordance with an embodiment of the present invention may include a sensor unit 100, an integrated control unit 200, a failure determination unit 300, a backup control unit 400, a vehicle individual control unit 500. The sensor unit 100 may include one or more sensing devices. The integrated control unit 200 may include a merging unit 210, a control command generation unit 220, a control command integration unit 230, and a display control unit 240. The vehicle individual control unit 500 may include an engine control unit 510, a braking control unit 520, a steering control unit 530, and a display unit 540.

The sensor unit 100 may include one or more sensing devices provided in the vehicle. Each of the sensing devices may provide driving environment information by sensing driving environments of the vehicle. Here, each of the sensing devices included in the sensor unit 100 may employ a camera (for example, a front camera, a rear camera, a left side camera, and a right side camera) for capturing a peripheral image of the vehicle, and a radar (for example, a front radar and a side radar) for detecting an external object around the vehicle. FIG. 2 illustrates an example in which the sensor unit 100 includes a front camera 110, a front radar 120, and a side radar 130. Therefore, the driving environment information provided by the sensor unit 100 may include external object information and lane information respectively obtained by the camera and the radar. Meanwhile, the sensor unit 100 may provide state information of each sensor device together with driving environment information as illustrated in FIG. 2.

As illustrated in FIG. 1, the integrated control apparatus for the vehicle in accordance with the present embodiment may receive one or more pieces of driving condition information of the vehicle from a network (for example, a Controller Area Network (CAN), Media Oriented Systems Transport (MOST), FlexRay, or the like) applied to the vehicle. As illustrated in FIG. 2, one or more pieces of driving condition information may include driver operation information (for example, steering operation information, accelerator pedal operation information, brake pedal operation information, shift operation information, or the like), vehicle driving information (for example, current vehicle speed information, acceleration information, steering information, or the like), and vehicle specification information (for example, vehicle model information, vehicle width information, or the like).

The integrated control unit 200 may generate one or more control commands for the driving control of the vehicle based on one or more pieces of driving condition information of the vehicle received from the network of the vehicle and each driving environment information received from the sensor unit 100, may mediate the generated control commands according to the priorities determined based on the driving safety of the vehicle and assigned to the respective control commands, and may generate the final control command in which the output response characteristic of the driving control according to the control command having the higher priority is optimized.

That is, the present embodiment improves a conventional method in which each driving environment information provided from the sensor unit 100 is transmitted to each individual control system (engine control system, braking control system, steering control system, or the like) applied to the vehicle and the driving of each vehicle is individually controlled. The present embodiment employs a configuration in which the integrated control unit 200 functioning as an upper integrated control system of each individual control system is employed to generates one or more control commands for driving control of the vehicle through the integrated control unit 200 and mediate each generated control command, thereby eliminating the redundancy problem between the respective control commands and improving the control performance of the autonomous vehicle.

Hereinafter, the operation of the integrated control unit 200 will be specifically described as its subordinate configuration.

The merging unit 210 may generate merged driving condition information and merged driving environment information by merging driving condition information from the network of the vehicle and driving environment information from the sensor unit 100.

Specifically, as described above, each driving condition information transmitted from the network of the vehicle includes driver operation information (for example, steering operation information, accelerator pedal operation information, brake pedal operation information, shift operation information, or the like), vehicle driving information (for example, current vehicle speed information, acceleration information, steering information, or the like), and vehicle specification information (for example, vehicle model information, vehicle width information, or the like). The merging unit 210 may merge each driving condition information to generate merged driving condition information, which is information necessary for the control command generation unit 220 to generate the control command, as described later. As the method of merging each driving condition information, various methods may be employed. For example, the merged driving condition information may be generated by integrating the steering operation information selected from the driver operation information, the current vehicle speed information selected from the vehicle driving information, and the vehicle width information selected from the vehicle specification information.

In addition, as described above, the driving environment information transmitted from the sensor unit may include the external object information and the lane information obtained by the sensing device, that is, the camera and the radar, respectively. The merging unit 210 may merge each driving environment information to generate the merged driving environment information which is information necessary for the control command generation unit 220 to generate the control command as described later. As the method of merging each driving environment information, various methods may be employed. For example, the merged driving environment information may be generated by selecting and integrating the lane information obtained by the front camera 110 and the external object information obtained by the front radar 120 among the external object information and the lane information obtained by the front camera 110, the external object information obtained by the front radar 120, and the external object information obtained by the rear radar. The merged driving environment information generated according to the above-described method includes the external object information and the lane information.

The calculation load occurring during the process by which the merging unit 210 processes a plurality of information by merging the plurality of information, which is the basis of generation of the control command, into the merged driving condition information and the merged driving environment information, may be reduced and the accuracy of the autonomous driving control may be improved.

The control command generation unit 220 may generate one or more control commands for driving control of the vehicle based on the merged driving condition information and the merged driving environment information generated by the merging unit 210. As illustrated in FIG. 2, the control command generation unit 220 may include a longitudinal control command generation unit 221, a transverse control command generation unit 222, and a basic control command generation unit 223.

The longitudinal control command generation unit 221 may generate an acceleration/deceleration control command for avoiding a collision with an external object located in the longitudinal direction of the vehicle, based on the merged driving condition information and the merged driving environment information.

That is, the longitudinal control command generation unit 221 may grasp information such as the vehicle speed or the acceleration in the longitudinal direction of the current vehicle from the merged driving condition information, grasp may grasp an external object (for example, another vehicle, a pedestrian, a two-wheeled vehicle, or the like) located in the longitudinal direction (front-rear direction) of the vehicle from the merged driving environment information, may grasp a distance from the vehicle to the external object, and may generate the acceleration/deceleration control command for avoiding a collision with the external object located in the longitudinal direction of the vehicle, based on the grasped information. The acceleration/deceleration control command means an acceleration control amount of the vehicle for avoiding a collision with an external object (that is, a deceleration control amount (negative acceleration) for avoiding a collision with a front external object or an acceleration control amount (negative acceleration) for avoiding a collision with a rear external object).

The transverse control command generation unit 222 may generate a steering control command for avoiding a collision with an external object located in the transverse direction of the vehicle or preventing lane departure during driving, based on the merged driving condition information and the merged driving environment information.

That is, the transverse control command generation unit 222 may grasp information such as the steering operation information of the driver and the vehicle speed or acceleration in the transverse direction of the current vehicle from the merged driving condition information, may grasp the external object (for example, another vehicle driving on the adjacent lane) or the lane located in the transverse direction (lateral direction) of the vehicle from the merged driving environment information, and may grasp the distance from the vehicle to the external object or the lane, and the transverse control command generation unit 222 may generate the steering control command for avoiding a collision with the external object located in the transverse direction of the vehicle or preventing lane departure during driving, based on the grasped information. The steering control command means a steering torque control amount of the vehicle for avoiding a collision with an external object or preventing lane departure (the sign thereof is changed according to a left-direction steering torque control amount or a right-direction steering torque control amount, and a left direction or a right direction).

The longitudinal control command generation unit 221 and the transverse control command generation unit 222 described above may be operable to generate the acceleration/deceleration control command and the steering control command only in a specific situation in which the external object is detected in the longitudinal direction or the transverse direction of the vehicle, or it is determined that there is a possibility of lane departure during driving.

The basic control command generation unit 223 may generate the basic control command for real-time driving of the vehicle based on the merged driving condition information and the merged driving environment information.

The basic control command generation unit 223 may be configured by a system applied to the vehicle for driver convenience, and may operate to generate the control command in real time (continuously) during a vehicle driving process, not generating the control command only in a specific situation in which emergency control is required, such as the longitudinal control command generation unit 221 and the transverse control command generation unit 222. The basic control command generated by the basic control command generation unit 223 includes a basic acceleration/deceleration control command (for example, an acceleration/deceleration control command for coping with an overspeed camera, an acceleration/deceleration control command coping in a curve, an acceleration/deceleration control command for maintaining a distance from a preceding vehicle, or the like), a basic steering control command (for example, a steering control command for lane keeping and lane change during a vehicle real-time driving process), and a setting speed following control command.

According to the operations of the longitudinal control command generation unit 221, the transverse control command generation unit 222, and the basic control command generation unit 223 described above, the vehicle real-time driving may be controlled depending on the basic control command generated by the basic control command generation unit 223 during the vehicle real-time driving process. Emergency control of the vehicle may be performed according to the acceleration/deceleration control command or the steering control command generated by the longitudinal control command generation unit 221 or the transverse control command generation unit 222 In a specific situation in which an external object is detected in the longitudinal direction or the transverse direction of the vehicle or it is determined that there is a possibility of lane departure during driving. At this time, the mediation method between the basic control command, the acceleration/deceleration control command, and the steering control command is required. Hereinafter, the mediation method between the respective control commands will be mainly described with reference to the operation of the control command integration unit 230.

The control command integration unit 230 may generate a final control command, in which the output response characteristic of the driving control according to the emergency control command is optimized, by assigning higher priority to the emergency control command determined by one of the acceleration/deceleration control command transmitted from the longitudinal control command generation unit 221 and the steering control command transmitted from the transverse control command generation unit 222, as compared with the basic control command transmitted from the basic control command generation unit 223. Hereinafter, the emergency control command means one of the acceleration/deceleration control command and the steering control command.

Specifically, as described above, the acceleration/deceleration control command and the steering control command are not generated in real time during the vehicle real-time driving process such as the basic control command, but are generated in a dangerous situation in which the external object is detected in the longitudinal direction or the transverse direction of the vehicle or it is determined that there is a possibility of lane departure during driving. Therefore, the acceleration/deceleration control command and the steering control command must have higher priority as compared with the basic control command, the emergency control command must be output as a final control command in a dangerous situation, instead of the basic control command. However, as described later, when only simple mediation is performed between the basic control command and the emergency control command (that is, the basic control command is simply replaced with the emergency control command), the output response characteristic of the driving control according to the emergency control command may be reduced.

Therefore, in the present embodiment, the control command integration unit 230 may generate the final control command that minimizes a delay time until the start of the driving control according to the emergency control command in consideration of each sign of the emergency control command and the basic control command (therefore, the output response characteristic of the driving control according to the emergency control command is optimized).

First, the operation of the control command integration unit 230 when the emergency control command and the basic control command have the same sign will be described with reference to FIG. 3.

Figure 3A:
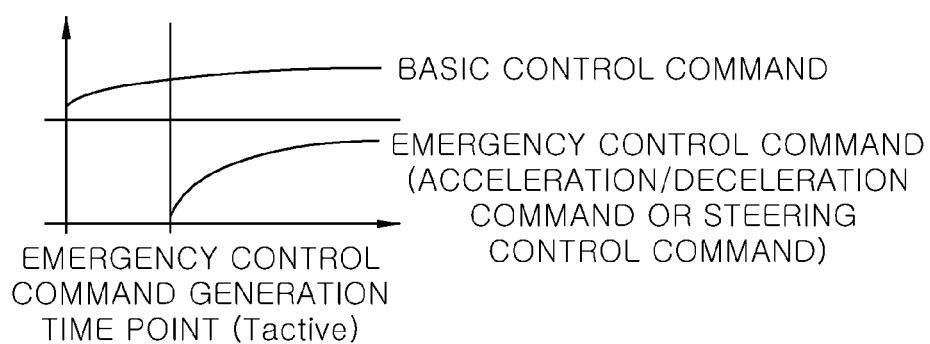
FIGS. 3A through 3E and 4A through 4C are exemplary diagrams for describing a process of generating a final control command by a control command integration unit in an integrated control apparatus for a vehicle in accordance with an embodiment of the present invention.
Figure 3B:
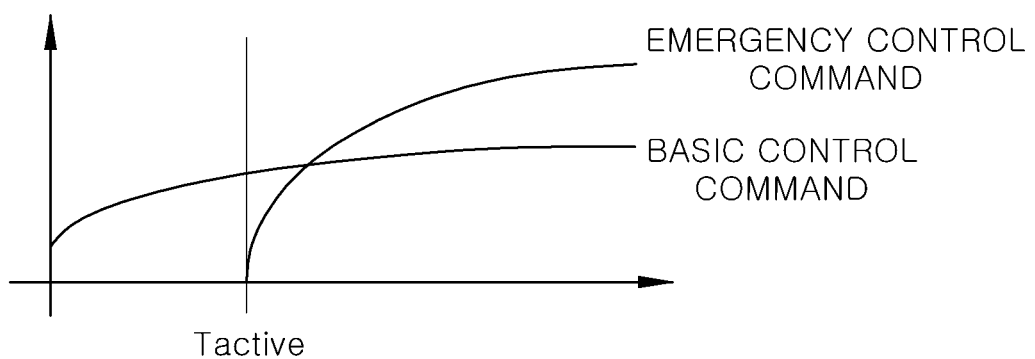

FIG. 3A illustrates an example in which the emergency control command having the same sign as the basic control command is generated at $T_{active}$ when the basic control command is generated in real time, and FIG. 3B illustrates the basic control command and the emergency control command on the same axis.

Figure 3C:
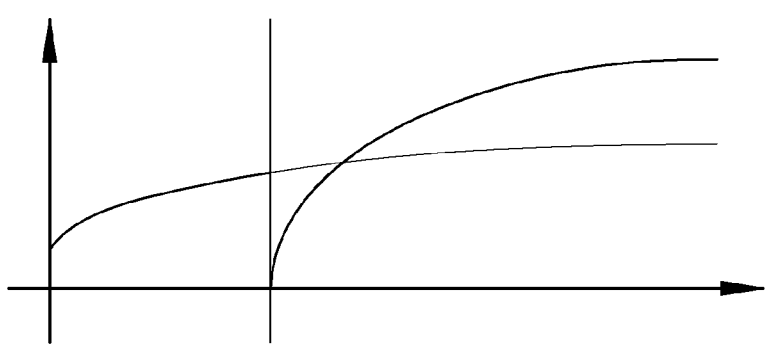

At this time, as illustrated in FIG. 3C, when the emergency control command is generated and output as the final control command by simply mediating the basic control command and the emergency control command, the final control command is output with the initial value of "0". Therefore, the delay time occurs until the driving control according to the emergency control command is started.

Figure 3D:
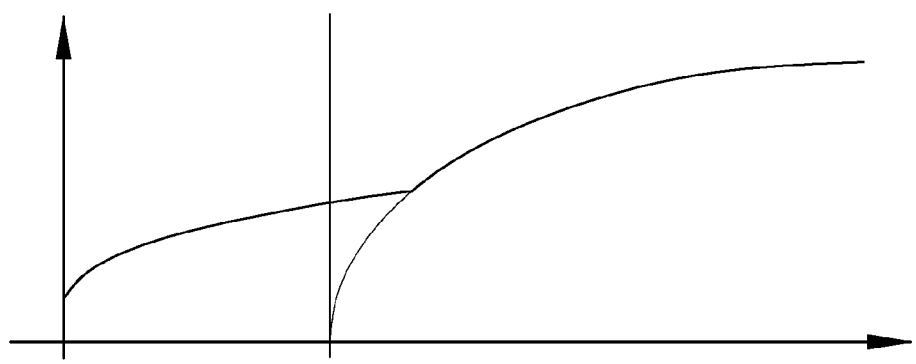

In addition, as illustrated in FIG. 3D, when the final control command is generated and output by selecting a larger value among the absolute values of the basic control command and the emergency control command, the delay time occurs until the start of the driving control according to the emergency control command is started, although smaller than in the case of FIG. 3C.

Therefore, when the signs of the emergency control command and the basic control command are the same, the control command integration unit 230 may generate the final control command by correcting the emergency control command, with the value of the basic control command at the time of generating the emergency control command as the initial value of the emergency control command.

Figure 3E:
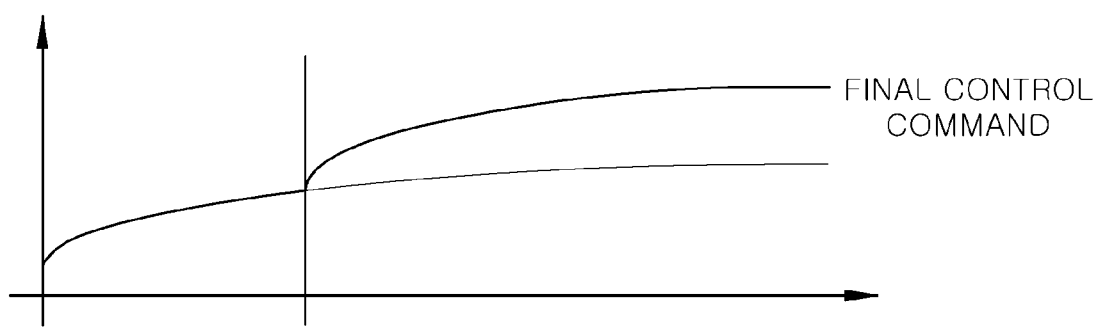

That is, as illustrated in FIG. 3E, when the emergency control command is corrected with the value of the basic control command at $T_{active}$ as the initial value of the emergency control command, the delay time in FIGS. 3C and 3D may be minimized to generate the final control command in which the output response characteristic of the driving control according to the emergency control command is optimized.

Next, the operation of the control command integration unit 230 when the signs of the emergency control command and the sign of the basic control command are different will be described with reference to FIG. 4.

Figure 4A:
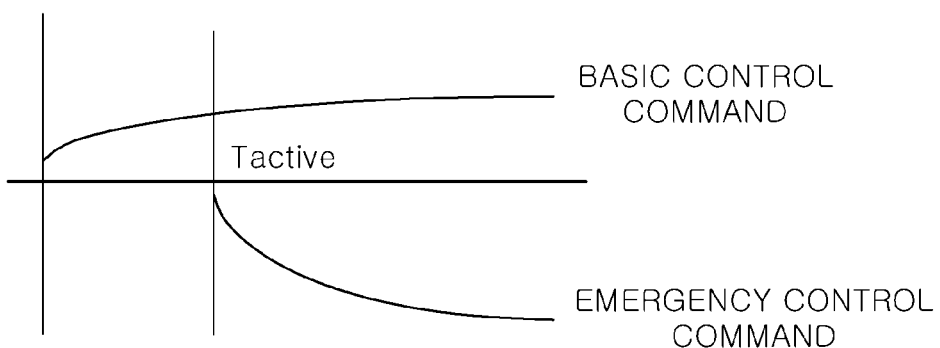

FIG. 4A illustrates an example in which the emergency control command having a different sign from the basic control command is generated at $T_{active}$ when the basic control command is generated in real time.

Figure 4B:
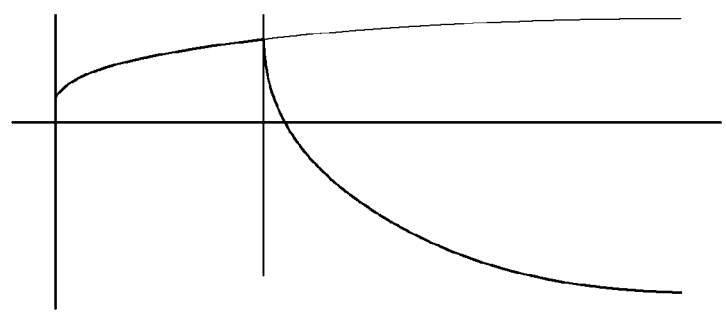

In this case, when the signs of the emergency control command and the basic control command are the same, and when the final control command is generated by correcting the emergency control command, with the value of the basic control command at the time of generating the emergency control command as the initial value of the emergency control command, the delay time occurs until the driving control according to the emergency control command is started as illustrated in FIG. 4B.

Therefore, when the signs of the emergency control command and the basic control command are different, the control command integration unit 230 may generate the emergency control command as the final control command.

Figure 4C:
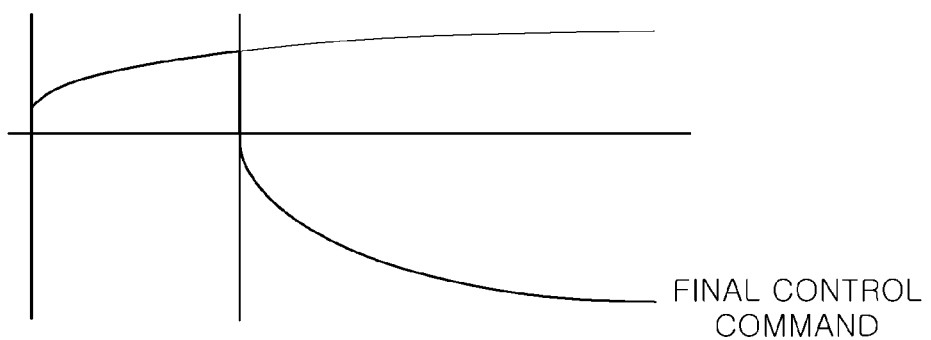

That is, as illustrated in FIG. 4C, by generating the emergency control command as the final control command after $T_{active}$, the delay time in FIG. 4B may be minimized and the output response characteristic of the driving control according to the emergency control command may be optimized.

Hereinafter, the operation of the control command integration unit 230 will be described as a specific example.

The acceleration/deceleration control command and the steering control command respectively generated by the longitudinal control command generation unit 221 and the transverse control command generation unit 222 are denoted by A1 and T1, respectively. The basic acceleration/deceleration control command (basic acceleration control amount) and the basic steering control command (basic steering torque control amount) generated by the basic control command generation unit 223 are denoted by A2 and T2, respectively. The final acceleration/deceleration control command and the final steering control command generated as the final control command by the control command integration unit 230 are denoted by A3 and T3, respectively.

First, a case where A1 is generated and T1 is not generated (that is, a case where the longitudinal control command generation unit 221 is activated and the transverse control command generation unit 222 is deactivated) will be described.

When the signs of A1 and A2 are the same (that is, when the signs of the accelerations are the same), A1 is corrected so as to have the value of A2 at the time of generating A1 as the initial value, and the corrected A1 is generated as A3. When the signs of A1 and A2 are different (that is, when the signs of accelerations are different), A3 after the generation time point of A1 is generated as A1. On the other hand, T3 is maintained as T2.

Next, a case where both A1 and T1 are generated (that is, a case where both the longitudinal control command generation unit 221 and the transverse control command generation unit 222 are activated) will be described.

When the signs of A1 and A2 are the same (that is, when the signs of the accelerations are the same), A1 is corrected so as to have the value of A2 at the time of generating A1 as the initial value, and the corrected A1 is generated as A3. When the signs of A1 and A2 are different (that is, when the signs of accelerations are different), A3 after the generation time point of A1 is generated as A1.

When the signs of T1 and T2 are the same (that is, when the steering directions are the same), T1 is corrected so as to have the value of T2 at the time of generating T1 as the initial value, and the corrected T1 is generated as T3. When the signs of T1 and T2 are different (that is, when the steering directions are different), T3 after the generation time point of T1 is generated as T1.

Next, a case where T1 is generated and A1 is not generated (that is, a case where the transverse control command generation unit 222 is activated and the longitudinal control command generation unit 221 is deactivated) will be described.

When the signs of T1 and T2 are the same (that is, when the steering directions are the same), T1 is corrected so as to have the value of T2 at the time of generating T1 as the initial value, and the corrected T1 is generated as T3. When the signs of T1 and T2 are different (that is, when the steering directions are different), T3 after the generation time point of T1 is generated as T1. On the other hand, A3 is maintained as A2.

When both A1 and T1 are not generated (that is, both the longitudinal control command generation unit 221 and the transverse control command generation unit 222 are deactivated), A3 and T3 are maintained as A2 and T2, respectively.

On the other hand, when the acceleration control command or the steering control command is received from the longitudinal control command generation unit 221 or the transverse control command generation unit 222, the control command integration unit 230 may generate warning information for notifying the driver of the dangerous situation, as illustrated in FIG. 2. The warning information may be provided to the driver through the display unit 540 described later.

The control command integration unit 230 may transmit the generated final control command and the generated warning information to the vehicle network. The final control command and the warning information transmitted to the vehicle network may be transmitted to the vehicle individual control unit 500 described later and may be used for driving control of the vehicle and display control of the vehicle, respectively.

The display control unit 240 may generate a display control command for causing the final control command generated by the control command integration unit 230 to be processed and output in the form recognizable by the driver. A display unit described later may receive the display control command from the vehicle network and visually provide the final control command to the driver. Furthermore, the display control unit 240 may generate the display control command in consideration of the failure information generated by the failure determination unit 300 described later. Therefore, the display unit may receive the display control command considering the failure information and visually provide the driver with the failure state of the integrated control unit 200.

The failure determination unit 300 may determine the failure or not of the integrated control unit 200 by determining the validity of at least one of the merged driving condition information, the merged driving environment information, the respective control commands (that is, the acceleration/deceleration control command, the steering control command, and the basic control command), and the final control command. That is, when at least one of the merged driving condition information, the merged driving environment information, the respective control commands, and the final control command has a value outside an expected range in a normal state, the failure determination unit 300 may determine that the integrated control unit 200 is failed. The expected range may be preset in the failure determination unit 300.

When the failure determination unit 300 determines that the integrated control unit 200 is failed, the backup control unit 400 may generate a backup control command (including a backup acceleration/deceleration control command and a backup steering control command) for driving control of the vehicle based on each driving environment information received from the sensor unit 100. That is, the backup control unit 400 may perform redundancy logic for driving control of the vehicle when the integrated control unit 200 is failed. The driving control accuracy by the backup control command (that is, the precision level of the backup control command) may be variously designed according to the designer's intention in consideration of the specification of the system.

The vehicle individual control unit 500 may receive the final control command generated by the control command integration unit 230 or the backup control command generated by the backup control unit 400 from the vehicle network, and may control the driving of the vehicle. That is, the driving, braking, and steering of the vehicle may be controlled through an engine control unit 510 (for example, an engine control unit (ECU)), a braking control unit 520 (for example, an electronic stability control (ESC)), and a steering control unit 530 (for example, a motor driven power steering (MDPS)), based on the final control command or the backup control command transmitted through the vehicle network. In addition, the final control command and the failure state of the integrated control unit 200 may be visually provided to the driver through the display unit 540 (for example, an LCD provided in an instrument panel), based on the display control command transmitted through the vehicle network.

The integrated control unit 200, its subordinate configurations 210 to 240, the failure determination unit 300, the backup control unit 400, the vehicle individual control unit 500, and its subordinate configurations 510-540 described above may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electronic units for performing other functions.

Figure 5:
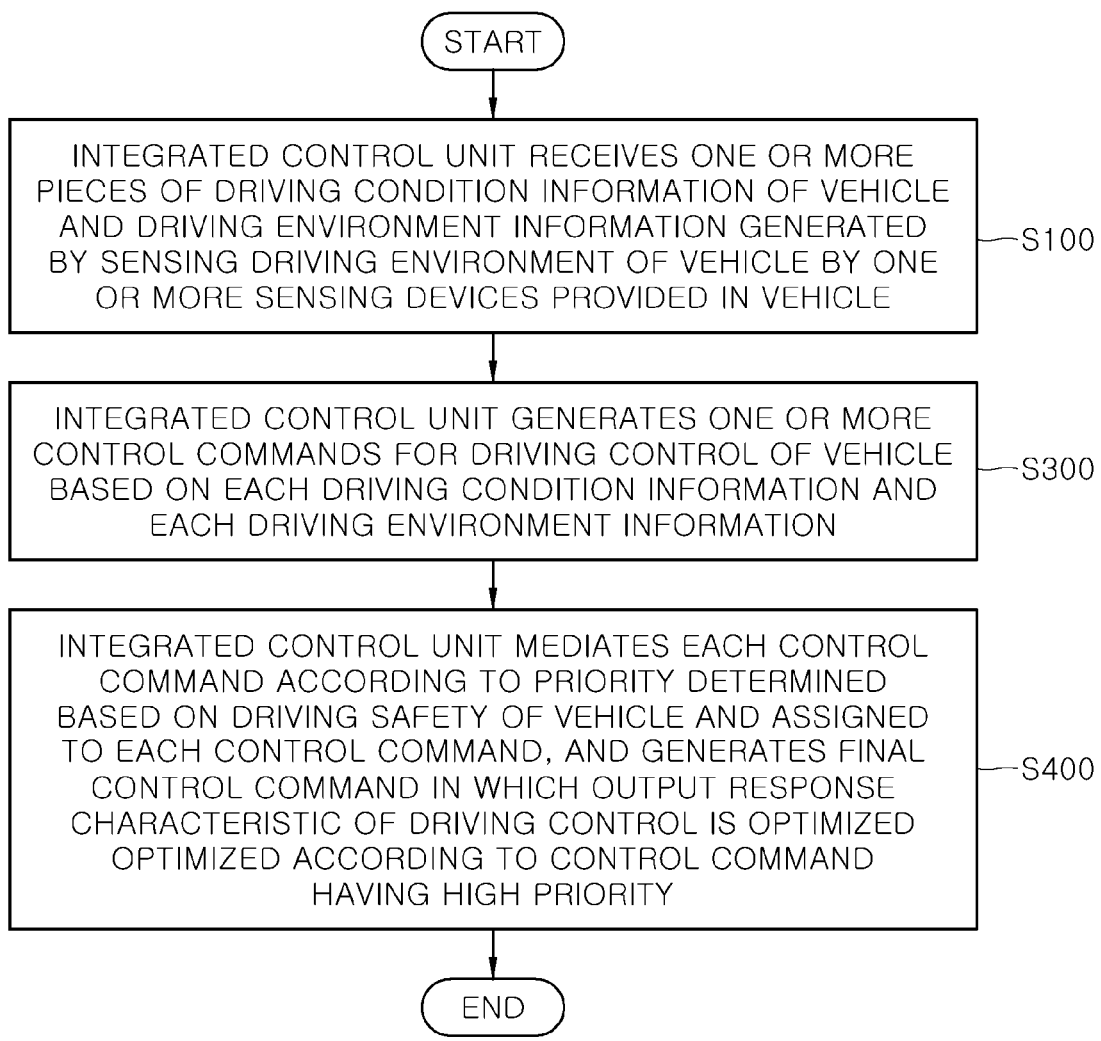
FIGS. 5 and 6 are flowcharts for describing an integrated control method for a vehicle in accordance with an embodiment of the present invention.
Figure 6:
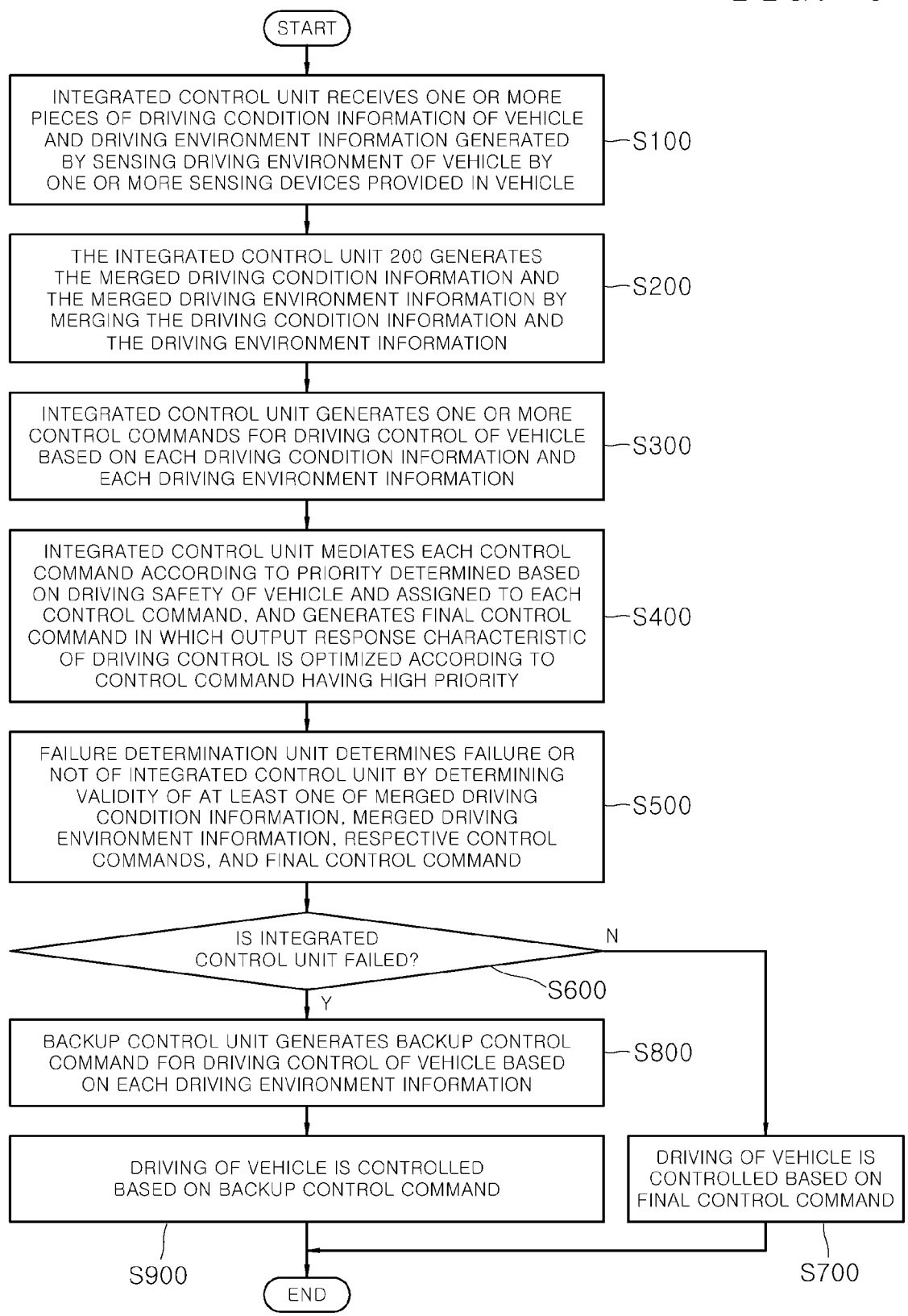

FIGS. 5 and 6 are flowcharts for describing an integrated control method for a vehicle in accordance with an embodiment of the present invention.

Referring to FIG. 5, an integrated control method for a vehicle in accordance with an embodiment of the present invention may include: step S100 of receiving, by the integrated control unit 200, one or more pieces of driving condition information of the vehicle and driving environment information generated by sensing driving environment of the vehicle by one or more sensing devices provided in the vehicle; step S300 of generating, by the integrated control unit 200, one or more control commands for the driving control of the vehicle based on each driving condition information and each driving environment information; and step S400 mediating, by the integrated control unit 200, each control command according to the priority determined based on the driving safety of the vehicle and assigned to each control command, and generating the final control command in which the output response characteristic of the driving control is optimized according to the control command having high priority.

The integrated control method for the vehicle in accordance with the embodiment of the present invention will be described in detail with reference to FIG. 6. First, the integrated control unit 200 receives one or more pieces of driving condition information of the vehicle and driving environment information generated by sensing driving environment of the vehicle by one or more sensing devices provided in the vehicle (S100).

Then, the integrated control unit 200 generates the merged driving condition information and the merged driving environment information by merging the driving condition information and the driving environment information (S200).

Then, the integrated control unit 200 generates one or more control commands for driving control of the vehicle based on the merged driving condition information and the merged driving environment information (S300).

In step S300, the integrated control unit 200 generates an acceleration/deceleration control command for avoiding a collision with an external object located in the longitudinal direction of the vehicle, a steering control command for avoiding a collision with an external object located in the transverse direction of the vehicle or preventing lane departure during driving, and a basic control command for real-time driving of the vehicle, based on the merged driving condition information and the merged driving environment information.

Then, the integrated control unit 200 mediates each control command according to the priority determined based on the driving safety of the vehicle and assigned to each control command, and generates the final control command in which the output response characteristic of the driving control according to the control command having higher priority is optimized (S400).

In step S400, the integrated control unit 200 assigns higher priority to the emergency control command determined by any one of the acceleration/deceleration control command and the steering control command as compared with the basic control command, and generates the final control command in which the output response characteristic of the driving control according to the emergency control command is optimized. That is, the integrated control unit 200 generates the final control command that minimizes the delay time until the start of the driving control according to the emergency control command in consideration of the signs of the emergency control command and the basic control command.

Specifically, in step S400, when the signs of the emergency control command and the basic control command are the same, the integrated control unit 200 generates the final control command by correcting the emergency control command, with the value of the basic control command at the time of generating the emergency control command as the initial value of the emergency control command, and when the signs of the emergency control command and the basic control command are different, the integrated control unit 200 generates the emergency control command as the final control command.

Then, the failure determination unit 300 determines the failure or not of the integrated control unit 200 by determining the validity of at least one of the merged driving condition information, the merged driving environment information, the respective control commands, and the final control command (S500).

When the failure determination unit 300 determines that the integrated control unit 200 is not failed (S600), the vehicle individual control unit 500 controls the driving of the vehicle based on the final control command (S700).

When the failure determination unit 300 determines that the integrated control unit 200 is failed (S600), the backup control unit 400 generates the backup control command for driving control of the vehicle based on each driving environment information (S800), and the vehicle individual control unit 500 controls the driving of the vehicle based on the backup control command (S900).

As described above, in accordance with the present embodiment, it is possible to improve adaptability to the high-level autonomous driving system by providing the integrated architecture in which the plurality of driver assistance systems are integrated, it is possible to eliminate the redundancy problem between control commands by integrating and mediating the plurality of control commands generated by the plurality of driver assistance systems, and it is possible to improve the control performance of the autonomous vehicle.

In accordance with an aspect of the present invention, it is possible to improve adaptability to a high-level autonomous driving system by providing an integrated architecture that integrates a plurality of driver assistance systems, and it is possible to eliminate the redundancy problem between the respective control commands and improve the control performance of the autonomous vehicle by integrating and mediating a plurality of control commands generated by a plurality of driver assistance systems.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An integrated control apparatus for a vehicle, comprising:
   one or more sensors disposed in the vehicle, each of the one or more sensors being configured to provide driving environment information by sensing driving environments of the vehicle during real-time driving of the vehicle;
   an integrated controller configured to:
   respectively generate, based on one or more pieces of the driving environment information received from the one or more sensors and based on one or more pieces of driving condition information of the vehicle received from a network of the vehicle during the real-time driving of the vehicle, a basic control command for the real-time driving control of the vehicle with respect to movement of the vehicle in longitudinal and/or transverse directions of the vehicle and, at a time of a determined emergency occurrence, an emergency control command with respect to the longitudinal and/or the transverse directions of the vehicle for emergency driving control of the vehicle; and
   generate a final control command, including:
   generate, at times other than the time of the determined emergency occurrence, the final control command based on the basic control command;
   generate, at the time of the determined emergency occurrence, the final control command to be one of a longitudinal or transverse movement-representing value represented by the emergency control command in response to a sign of the value represented by the emergency control command having a first relationship with respect to a sign of a value represented by the basic control command at the time of the determined emergency occurrence; and
   generate, at the time of the determined emergency occurrence, the final control command to include a value of a combination of the value represented by the emergency control command and the value represented by the basic control command in response to the sign of the value represented by the emergency control command having a second relationship, different from the first relationship, with respect to the sign of the value represented by the basic control command; and
   a vehicle individual controller configured to control the real-time driving of the vehicle based on the final control command received from the integrated controller.

2. The integrated control apparatus of claim 1, wherein the integrated controller is further configured to:
   generate merged driving condition information and merged driving environment information by merging the one or more pieces of the driving condition information and the one or more pieces of the driving environment information, respectively; and
   the respective generation of the basic control command and the emergency control command are based on the merged driving condition information and the merged driving environment information.

3. The integrated control apparatus of claim 1, wherein the emergency control command comprises any one or any combination of:
   an acceleration/deceleration control command to avoid a collision with an external object located in a longitudinal direction of the vehicle;
   a steering control command to avoid a collision with an external object located in a transverse direction of the vehicle; and
   a steering control command to prevent lane departure of the vehicle.

4. The integrated control apparatus of claim 1, wherein the emergency occurrence is determined in response to any one of an external object being located in a longitudinal direction of the vehicle, an external object being located in a transverse direction of the vehicle, or a determined lane departure of the vehicle.

5. The integrated control apparatus of claim 1, further comprising a display configured to display information based on a received display control command,
   wherein the integrated controller is further configured to generate the display control information to include information corresponding to at least one of the final control command or the emergency occurrence.

6. The integrated control apparatus of claim 1, wherein the first relationship corresponds to the sign of the value represented by the emergency control command being different from the sign of the value represented by the basic control signal and the second relationship corresponds to the sign of the value represented by the emergency control command being same as the sign of the value represented by the basic control signal, when the emergency control command and the basic control command in combination are additive with respect to a movement of the vehicle in a same longitudinal or transverse directions, and wherein the first relationship corresponds to the sign of the value represented by the emergency control command being same as the sign of the value represented by the basic control signal and the second relationship corresponds to the sign of the value represented by the emergency control command being different from the sign of the value represented by the basic control signal, when the emergency control command and the basic control command in combination are not additive with respect to the movement of the vehicle in the same longitudinal or transverse directions.

7. The integrated control apparatus of claim 2, comprising:
one or more processors configured to:
determine whether a failure of the integrated controller has occurred based on a determined invalidity of at least one of the merged driving condition information, the merged driving environment information, the basic control command, the emergency control command, or the final control command; and
generate, in response to a result of the determining of whether the failure of the integrated controller has occurred being that the failure has occurred, a backup control command based on the driving environment information, and outputting, instead of the final control command, the back control command to the vehicle individual controller which is configured to control the real-time driving of the vehicle based on the back control command.

8. A processor-implemented integrated control method for a vehicle, comprising:
by an integrated controller:
receiving one or more pieces of driving condition information of the vehicle generated during a real-time driving of the vehicle and one or more pieces of driving environment information generated during a real-time driving of the vehicle by real-time sensing of driving environments of the vehicle by one or more sensors disposed in the vehicle;
respectively generating, based on the one or more pieces of the driving environment information and the one or more pieces of driving condition information of the vehicle, a basic control command for the real-time driving control of the vehicle with respect to movement of the vehicle in longitudinal and/or transverse directions of the vehicle and, at a time of a determined emergency occurrence, an emergency control command with respect to the longitudinal and/or the transverse directions of the vehicle for emergency driving control of the vehicle; and
generating a final control command, including:
generating, at times other than the time of the determined emergency occurrence the final control command based on the basic control command;
generating, at the time of the determined emergency occurrence, the final control command to be one of a longitudinal or transverse movement-representing value represented by the emergency control command in response to a sign of the value represented by the emergency control command having a first relationship with resect to a sign of a value represented by the basic control command at the time of the determined emergency occurrence; and
generating, at the time of the determined emergency occurrence, the final control command to include a value of a combination of the value represented by the emergency control command and the value represented by the basic control command in response to the sign of the value represented by the emergency control command having a second relationship, different from the first relationship, with respect to the sign of the value represented by the basic control command; and
controlling, by a vehicle individual controller, the real-time driving of the vehicle based on the final control command.

9. The integrated control method of claim 8, further comprising:
generating merged driving condition information and merged driving environment information by merging the one or more pieces of the driving condition information and the one or more pieces of the driving environment information, respectively, and
the respective generating of the basic control command and the emergency control command are based on the merged driving condition information and the merged driving environment information.

10. The integrated control method of claim 8, wherein the emergency control command comprises any one or any combination of:
an acceleration/deceleration control command to avoid a collision with an external object located in the longitudinal direction of the vehicle;
a steering control command to avoid a collision with an external object located in the transverse direction of the vehicle; and
a steering control command to prevent lane departure of the vehicle.

11. The integrated control method of claim 8,
wherein the emergency occurrence is determined in response to any one of an external object being located in a longitudinal direction of the vehicle, an external object being located in a transverse direction of the vehicle, or a determined lane departure of the vehicle.

* * * * *